United States Patent
Lee

(10) Patent No.: US 8,011,233 B2
(45) Date of Patent: Sep. 6, 2011

(54) METHOD FOR CONFIRMING FUNCTION OF IDLING STOP AND RESTARTING SYSTEM

(75) Inventor: Tae Pyo Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 146 days.

(21) Appl. No.: 12/336,277

(22) Filed: Dec. 16, 2008

(65) Prior Publication Data

US 2009/0308148 A1 Dec. 17, 2009

(30) Foreign Application Priority Data

Jun. 11, 2008 (KR) ........................ 10-2008-0054802

(51) Int. Cl.
*G01M 15/04* (2006.01)
(52) U.S. Cl. .................................. 73/114.61; 73/114.62
(58) Field of Classification Search ............... 73/114.59, 73/114.61, 114.62; 123/179.4
See application file for complete search history.

(56) References Cited

U.S. PATENT DOCUMENTS

| | | | | |
|---|---|---|---|---|
| 6,526,931 B1* | 3/2003 | Vilou | ........................ | 123/179.4 |
| 6,671,612 B2* | 12/2003 | Fuse | ............................. | 701/112 |
| 6,772,723 B2* | 8/2004 | Aoki et al. | .................. | 123/179.4 |
| 6,817,329 B2* | 11/2004 | Buglione et al. | ........... | 123/179.4 |
| 7,096,840 B2* | 8/2006 | Asada et al. | ................ | 123/179.3 |
| 7,347,175 B2* | 3/2008 | Lupo et al. | .................. | 123/179.4 |
| 7,458,353 B2* | 12/2008 | Takahashi | .................. | 123/179.4 |
| 2004/0055553 A1* | 3/2004 | Asaka et al. | ................ | 123/179.3 |
| 2009/0241884 A1* | 10/2009 | Saitoh et al. | ............... | 123/179.4 |
| 2009/0271095 A1* | 10/2009 | Kojima | ......................... | 701/113 |
| 2010/0009219 A1* | 1/2010 | Kwon et al. | .................... | 429/13 |

* cited by examiner

*Primary Examiner* — Freddie Kirkland, III
(74) *Attorney, Agent, or Firm* — Morgan, Lewis & Bockius LLP

(57) ABSTRACT

A vehicle that is equipped with an idling stop and restarting system and method thereof for testing a function of the idling stop and restarting system may include counting the ignition number of an engine including a first ignition, accumulating the operating time period after the first ignition, and setting a charging value of a battery as a predetermined value, if the ignition number is smaller than a predetermined ignition number and/or if operating time period is shorter than a predetermined operating time period, wherein the idling stop and restarting system is operated regardless of the real charging value of the battery.

19 Claims, 4 Drawing Sheets

FIG. 4

| item | | ISG function [Normal] | E.O.L ISG function test [compulsive] |
|---|---|---|---|
| 1 | Idle Start & Condition for stop | - The vehicle speed is lower than 3km/hr<br>- The engine is in an idle state<br>- The gear is neutral<br>- The clutch is released<br>- The coolant temperature is higher than 60°C<br>- The catalyst temperature is higher than 200°C<br>- The vehicle speed is higher than 10km/h after key-ignition or idle starting<br>- The on/off switch is on<br>- The SOC value of the battery is enough | ↓ ↓ ↓ ↓<br><br>↓<br>↓ |
| 2 | ISG function prohibition | - The ON/OFF switch is ON<br>- The SOC value< the threshold value<br>- The safety belt is not worn<br>- ISG function is stopped when the door is open<br>- The hydraulic pressure for braking is low<br>- The sensor/switch related is out of order<br>- The communication line has failed.<br>- In the normal condition of the sensor/switch related to ISG | ↓<br>↓<br>↓<br>↓<br>↓<br>↓<br>↓<br>◆ In the normal condition of the sensor/switch related to ISG |
| 3 | Automatic ignition ON during idle stop | · The clutch is depressed<br>· The vehicle speed is higher than 10km/h and the gear is neutral<br>· The hydraulic pressure for braking is low according to the operation of the brake | ↓<br>↓<br><br>— |

# METHOD FOR CONFIRMING FUNCTION OF IDLING STOP AND RESTARTING SYSTEM

CROSS-REFERENCE TO RELATED APPLICATION

The present application claims priority to Korean Patent Application Number 10-2008-0054802 filed on Jun. 11, 2008, the entire contents of which application is incorporated herein for all purposes by this reference.

BACKGROUND OF THE INVENTION

1. Field of the Invention

The present invention relates to a method for testing a function of an engine's idling stop and restarting system, and more particularly to a method for testing a function of an engine's idling stop and restarting system that is operated at an end of an assembly line so as to improve productivity.

2. Description of Related Art

Generally, an idling stop and restarting system stops an engine in an idle state so as to reduce fuel consumption. Also, the engine is reignited without a key operation when the driving will of a driver is detected.

For example, when a vehicle speed is zero and a brake pedal is pressed for 3 seconds, the engine automatically stops, and when the brake pedal is not pressed and the accelerator pedal is pressed or a gear is shifted, the engine is reignited.

However, the idling stop and restarting system cannot operate according to a charging condition of a battery. Particularly, in order to detect the charging condition of the battery, at least four hours after staring the engine are needed. Accordingly, productivity can be decreased, because the idling stop and restarting system cannot be tested at an end of an assemble line.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a method for testing a function of an engine's idling stop and restarting system of a vehicle having advantages of quickly testing a function of the idling stop and restarting system regardless of a charging value of a battery such that work time is reduced, productivity is improved, and production cost is reduced.

In an aspect of the present invention, a method for testing a function of an idling stop and restarting system of a vehicle that is assembled, may include counting ignition number of an engine including a first ignition, wherein, if the ignition number is smaller than or equal to a predetermined ignition number, the idling stop and restarting system is operated regardless of real charging value of a battery.

A charging value of the battery may be set as a predetermined value when the ignition number is smaller than or equal to the predetermined ignition number, wherein the predetermined value is 100%, i.e., a full value.

The method for testing a function of an idling stop and restarting system may further include determining, before the counting of the ignition number of the engine, whether a current RPM of the engine is larger than a predetermined RPM value so as to determine whether the engine is ignited or not, wherein the predetermined RPM value is approximately 25.

The predetermined ignition number may be approximately 10.

The idling stop and restarting system may be operated based on the real charging value of the battery in case that the ignition number is larger than the predetermined ignition number.

The method for testing a function of an idling stop and restarting system may further include accumulating operating time period of the engine after the first ignition, wherein, if the accumulated operating time period is shorter than or equal to a predetermined operating time period, the idling stop and restarting system is operated regardless of the real charging value of the battery, wherein a charging value of the battery is set as a predetermined value when the accumulated operating time period is shorter than or equal to the predetermined operating time period. The predetermined value may be 100%, i.e., a full value.

The predetermined operating time period may be approximately 1440 sec.

The idling stop and restarting system may be operated based on the real charging value of the battery in case that the accumulated operating time period is longer than the predetermined operating time period.

In another aspect of the present invention, a vehicle that is equipped with an idling stop and restarting system so as to stop or reignite an engine in the idle condition, may include counting portion for counting ignition number of the engine including a first ignition, wherein, if the ignition number is smaller than or equal to a predetermined ignition number a control portion operates the idling stop and restarting system regardless of real charging value of a battery.

The control portion may set a charging value of the battery as a predetermined value when the ignition number is smaller than or equal to the predetermined ignition number, wherein the predetermined value is 100%, i.e., a full value.

The control portion may determine, before the counting portion counts the ignition number of the engine, whether a current RPM of the engine is larger than a predetermined RPM value so as to determine whether the engine is ignited or not.

The vehicle that is equipped with an idling stop and restarting system may further include accumulating portion for accumulating operating time period of the engine after the first ignition, and wherein, if the accumulated operating time period is shorter than or equal to a predetermined operating time period, the control portion operates the idling stop and restarting system regardless of the real charging value of the battery, wherein the control portion sets a charging value of the battery as a predetermined value when the accumulated operating time period is shorter than or equal to the predetermined operating time period.

The control portion may operate the idling stop and restarting system based on the real charging value of the battery in case that the ignition number is larger than the predetermined ignition number and/or the accumulated operating time period is longer than the predetermined operating time period.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 4 is a table showing an operation of an idling stop and restarting system according to an exemplary embodiment of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A method for testing a function of an idling stop and restarting system is explained in the following according to various embodiments of the present invention, while referring to the accompanying drawings.

Figure 1:
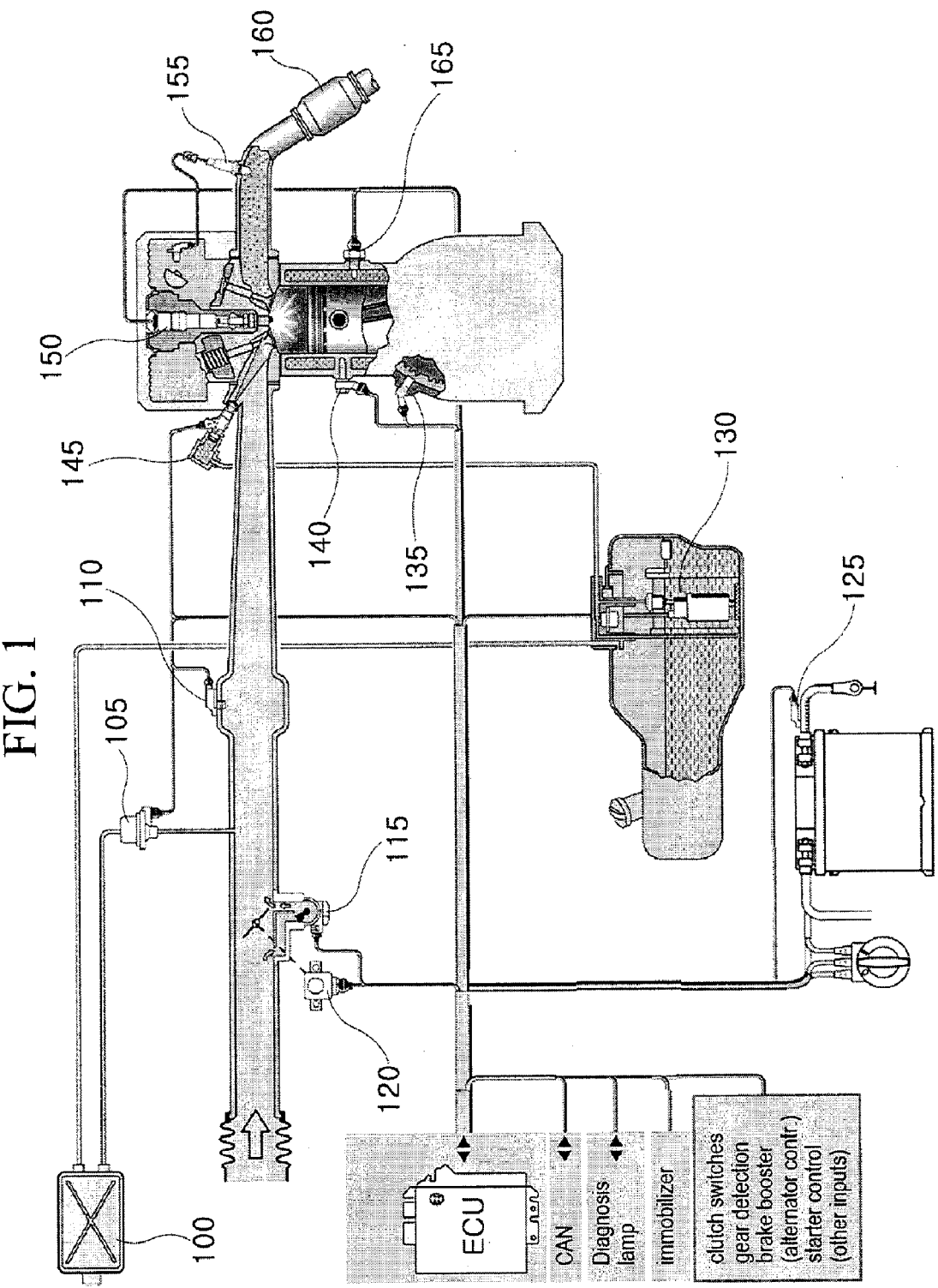
FIG. 1 is a schematic diagram of an engine system according to an exemplary embodiment of the present invention.
Figure 2:
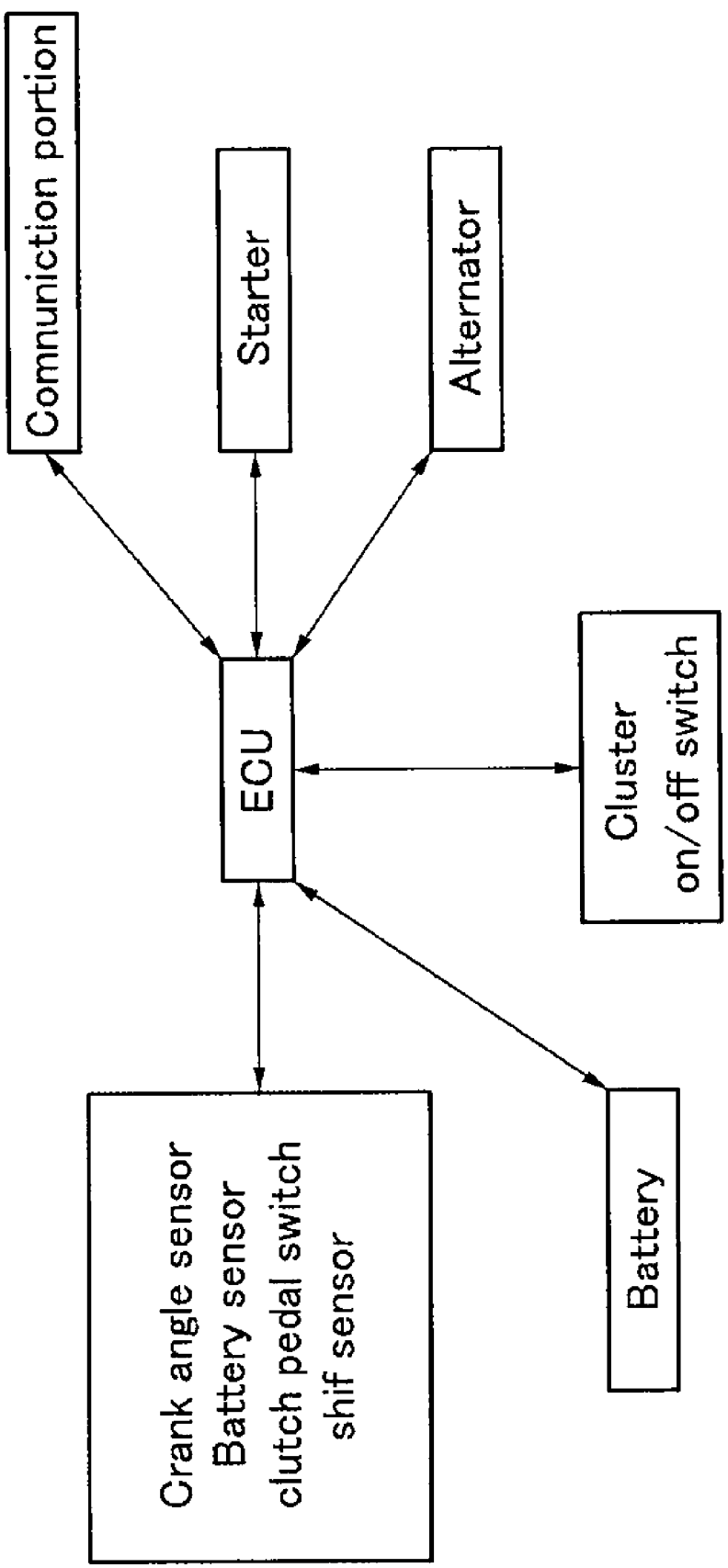
FIG. 2 is a schematic diagram of an idling stop and restarting system according to an exemplary embodiment of the present invention.

FIG. 1 is a schematic diagram of an engine system according to various embodiments of the present invention, and FIG. 2 is a schematic diagram of an idling stop and restarting system according to various embodiments of the present invention.

Referring to FIG. 1 and FIG. 2, an engine system includes a canister 100, a purge valve 105, an intake manifold sensor 110, an idle speed actuator 115, a throttle position sensor 120, a battery sensor 125, a fuel pump 130, a crank angle sensor 135, a knock sensor 140, an injector 145, a spark plug 150, an oxygen sensor 155, a catalyst 160, and a coolant sensor 165.

An electronic control unit (ECU) shown in the left side of FIG. 1 is electrically connected to the respective components, and controls the components based on signals that are transferred from the components.

The ECU includes a microprocessor, a memory, and a related hardware and software, and is programmed so as to operate the control logic of the present invention that is explained referring to FIG. 1.

Referring to FIG. 2, the ECU is electrically connected to the crank angle sensor, a battery sensor, a clutch pedal switch, a shift sensor, and a battery to receive signals therefrom, and controls them based on the signals.

Also, the ECU is electrically connected to a cluster, and an on/off switch is mounted in the cluster so as to operate an idling stop and restarting system. Further, the ECU is electrically and respectively connected to an alternator as an electrical generator, an igniter as an ignition motor, and a CAN system as a communication portion.

The ECU properly controls the respective components, and thereby the engine is stopped or reignited in the idle condition so that fuel consumption can be reduced.

In an exemplary embodiment of the present invention, the engine system may include a counting portion for counting ignition number of the engine and an accumulating portion for accumulating operating time period of the engine individually installed therein. The function of counting ignition number of the engine and the function of accumulating operating time period of the engine will be explained in detail later.

In another exemplary embodiment of the present invention, the ECU may be programmed to perform the function of the counting portion and the accumulating portion. Accordingly one may appreciate that the counting portion and the accumulating portion can be configured in software or hardware.

Figure 3:
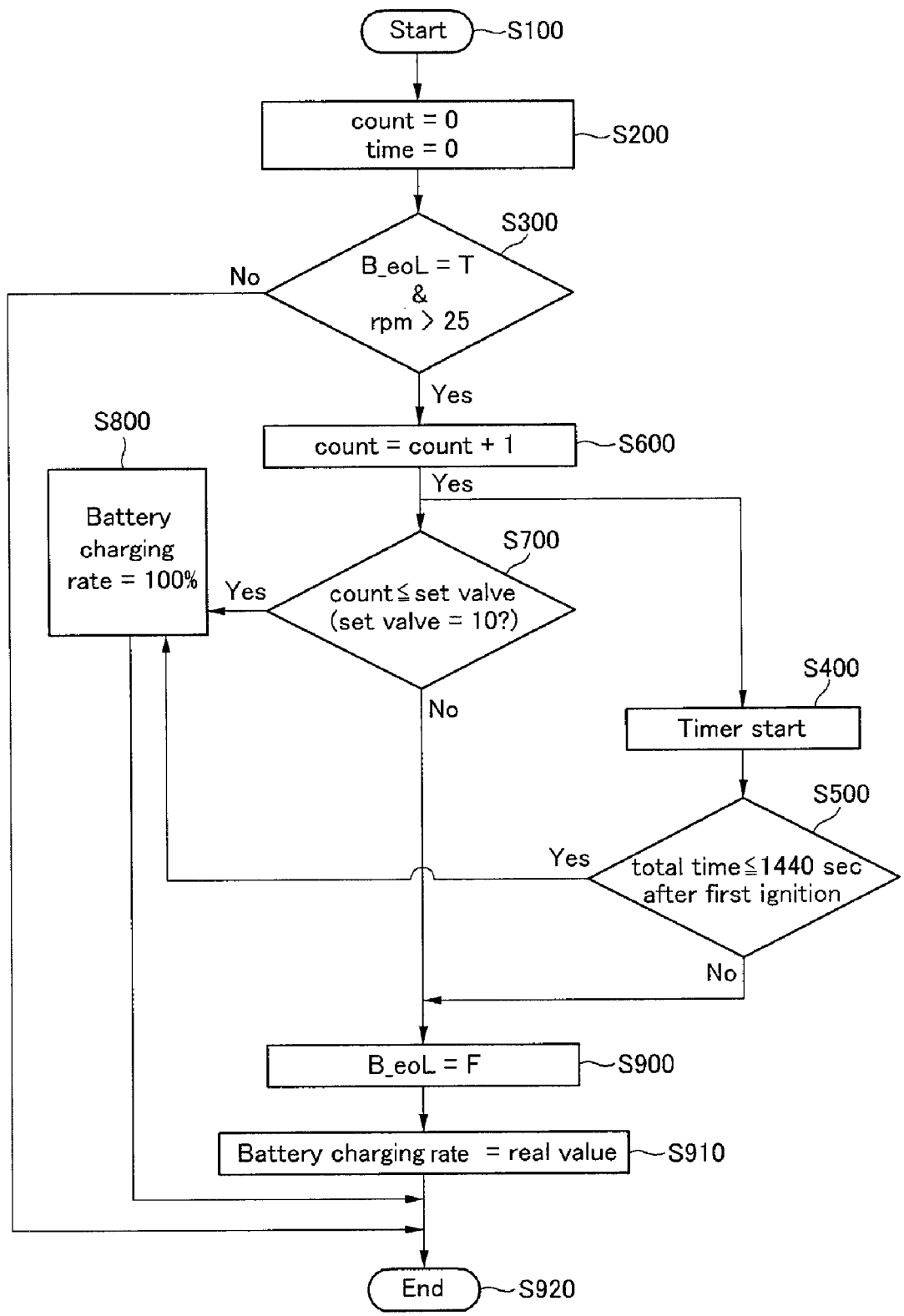
FIG. 3 is a flow chart showing a method for testing a function of an idling stop and restarting system according to an exemplary embodiment of the present invention.

FIG. 3 is a flow chart showing a method for testing a function of an idling stop and restarting system according to various embodiments of the present invention.

Referring to FIG. 1, a method for testing the function of the idling stop and restarting system includes an S100 step, an S200 step, an S300 step, an S400 step, an S500 step, an S600 step, an S700 step, an S800 step, an S900 step, an S910 step, and an S920 step.

The assemblage of the vehicle is complete in the S100 step, and the ignition number is 0 and the accumulated operating time period is 0 in the S200 step.

As it is true that the vehicle is at an end of the assembly line, it is determined whether the engine RPM is higher than a predetermined RPM value, such as 25 in the S300 step. The operating time period of the engine is accumulated after a first ignition of the engine in the S400 step. In this case, the operating time period is accumulated during performance of the idling stop and restarting function regardless of the operation of the engine once the first ignition of the engine is started.

The ignition number for the engine is counted in the S600 step, and it is determined whether the ignition number is higher than a predetermined ignition number (e.g., 10) in the S700 step.

It is determined whether the accumulated operating time period of the engine is larger than a predetermined operating time period (e.g., 1440 sec) in the S500 step.

When the accumulated operating time period is smaller than a predetermined operating time period (1440 sec) in the S500 step, the ECU sets the charging value of the battery to be 100%, i.e., a full value (default value) in the S800 step, and herein the real charging value of the battery is not considered.

In other words, the real charging value of the battery is not considered when the operating time period of the engine is smaller than the predetermined operating time period. Instead, it is forcibly predetermined that the battery is fully charged such that the idling stop and restarting system can be confirmed by a worker in various embodiments.

It is desirable that the charging value (e.g., full) of the battery is determined to be higher than the least value at which the idling stop and restarting system can operate at the end of the assembly line of the vehicle according to various embodiments.

In the S700 step, if the ignition number is smaller than the predetermined ignition number (for example 10), the ECU concludes that the battery is fully charged in the S800 step.

That is, when the ignition number of the engine is smaller than the predetermined ignition number, the real charging value of the battery is not considered. Instead, it is forcibly predetermined that the battery is fully charged such that the idling stop and restarting system can be confirmed by a worker in various embodiments.

When the operating time period is longer than the predetermined operating time period (1440 sec) in the S500 step, it is determined that it is false that the vehicle is not at an end of the assembly line in the S900 step. That is, when the operating time period is longer than the predetermined operating time period (1440 sec), the real charging value of the battery is considered for normal driving.

If the ignition number is larger than the predetermined ignition number (e.g., 10) in the S700 step, it is determined that it is false that the vehicle is at the end of the assembly line. That is, if the ignition number is larger than the predetermined ignition number, the real charging value of the battery is applied to ignite the engine.

Accordingly, when the ignition number is larger than the predetermined ignition number and/or the accumulated operating time period is longer than the predetermined operating time period, it is determined that it is false that the vehicle is at an end of the assemble line in the S900 step, and thereby the real charging value of the battery that is detected is considered in the S910 step.

The process according to various embodiments of the present invention is operated once at the end of the assembly line when the assembly of the vehicle is complete, particularly when the ignition number or the accumulated operating time period is smaller or shorter than the predetermined value.

A timer is used in the S400 step timer so as to accumulate the operation period of the engine in the S500 step. Furthermore, it is determined whether the RPM of the engine is larger than the predetermined RPM value (e.g., 25) in the S300 step so as to count the ignition number in the S600 step.

In the S900 step, when the ignition number is larger than the predetermined ignition number or the accumulated operating time period is longer than the predetermined operating time period, it is determined that it is false that the vehicle is at the end of the assembly line, that is, it is determined that the driver drives the vehicle in a normal condition, so the idling stop and restarting system is operated based on the real charging value of the battery.

That is, when the ignition number or the accumulated operating time period is smaller or shorter than the predetermined value, the idling stop and restarting system does not consider the real charging value of the battery, i.e., the idling stop and restarting system does not operate in the normal driving condition. In contrast, when the ignition number or the accumulated operating time period is larger or longer than the predetermined value, the idling stop and restarting system, the idling stop and restarting system considers the real charging value of the battery, i.e., the idling stop and restarting system operates so as to securely reignite the engine in the normal driving condition.

FIG. 4 is a table showing an operation of an idling stop and restarting system according to various embodiments of the present invention.

Referring to FIG. 4, the idling stop and restarting system is normally operated when the vehicle speed is lower than 3 km/h, the engine is in an idle condition, the gear is in a neutral position, and the clutch is released. At this time, the coolant temperature is to be higher than 60° C., the catalyst temperature is to be higher than 200° C., the operating switch is to be on, and the SOC of the battery is to be sufficient to securely reignite the engine.

Also, when the engine is ignited by a key or the vehicle speed is higher than 10 km/hr after ignition in the idle condition, the idling stop and restarting system operates normally.

Further, the idling stop and restarting system is not operated when the operating switch is off, the SOC value of the battery is lower than a predetermined value, the safety belt is not worn, the door is open, the hydraulic pressure for braking is low, or one of the related sensors and switches breaks down.

The engine is reignited in the idle stop condition when the clutch is pressed in a normal condition, the vehicle speed is higher than 10 km/hr, and the gear is neutral, or the hydraulic pressure for braking becomes lower.

However, in various embodiments of the present invention, the vehicle is operated regardless of coolant temperature or catalyst temperature so as to easily confirm that the idling stop and restarting system is normally operated at the end of the assembly line (eol: end of line).

Also, the battery is set to be charged as much as a predetermined value (e.g., 100%). Accordingly, the data about the SOC condition of the battery is analyzed. Exceptionally, when the hydraulic pressure for operating a brake is low, it is desirable that the idling stop and restarting system does not operate.

In the idling stop and restarting system, a crank angle sensor is disposed so as to reduce an ignition time when the engine is reignited, and a battery sensor is mounted so as to detect a charging value and performance thereof. Further, the operating switch that is manipulated by the driver is prepared, and the display portion is disposed in the cluster so as to notify an operating condition of the idling stop and restarting system.

Also, a neutral switch for sensing a neutral condition of the gear and a position detecting switch for sensing a position of the clutch pedal are disposed. An AGM type of battery is applied so as to improve durability of the battery. Further, it is desirable that a durable ignition motor and generator are used.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for testing a function of an idling stop and restarting system of a vehicle that is assembled, comprising:
    counting the number of engine starts, including a first starting,
    wherein, if the counted number is smaller than or equal to a predetermined number, the idling stop and restarting system is operated regardless of a real charging value of a battery.

2. The method for testing a function of the idling stop and restarting system of claim 1, wherein the real charging value of the battery is forcibly determined as a predetermined value when the counted number is smaller than or equal to the predetermined number.

3. The method for testing a function of the idling stop and restarting system of claim 2, wherein the predetermined value is 100%.

4. The method for testing a function of the idling stop and restarting system of claim 1, further comprising: determining, whether a current RPM of the engine is larger than a predetermined RPM value so as to determine whether the engine is started or not.

5. The method for testing a function of the idling stop and restarting system of claim 4, wherein the predetermined RPM value is approximately 25.

6. The method for testing a function of the idling stop and restarting system of claim 1, wherein the predetermined number is approximately 10.

7. The method for testing a function of the idling stop and restarting system of claim 1, wherein the idling stop and restarting system is operated based on the real charging value of the battery in case that the counted number is larger than the predetermined number.

8. The method for testing a function of the idling stop and restarting system, comprising:
   accumulating an operating time of an engine after a first starting,
   wherein, if the accumulated operating time is shorter than or equal to a predetermined operating time, the idling stop and restarting system is operated regardless of a real charging value of the battery.

9. The method for testing a function of the idling stop and restarting system of claim 8, wherein the real charging value of the battery is forcibly determined as a predetermined value when the accumulated operating time is shorter than or equal to the predetermined operating time.

10. The method for testing a function of the idling stop and restarting system of claim 9, wherein the predetermined value is 100%.

11. The method for testing a function of the idling stop and restarting system of claim 9, wherein the predetermined operating time is approximately 1440 sec.

12. The method for testing a function of the idling stop and restarting system of claim 9, wherein the idling stop and restarting system is operated based on the real charging value of the battery in case that the accumulated operating time is longer than the predetermined operating time.

13. A vehicle that is equipped with an idling stop and restarting system so as to stop or reignite an engine in an idle condition, comprising:
   counting portion for counting number that an engine is started, including a first starting,
   wherein, if the counted number is smaller than or equal to a predetermined number, a control portion operates the idling stop and restarting system regardless of a real charging value of a battery.

14. The vehicle that is equipped with the idling stop and restarting system of claim 13, wherein the control portion forcibly sets the real charging value of the battery as a predetermined value when the counted number is smaller than or equal to the predetermined number.

15. The vehicle that is equipped with the idling stop and restarting system of claim 14, wherein the predetermined value is 100%.

16. The vehicle that is equipped with an idling stop and restarting system of claim 13, wherein the control portion determines, whether a current RPM of the engine is larger than a predetermined RPM value so as to determine whether the engine is started or not.

17. The vehicle that is equipped with the idling stop and restarting system, comprising:
   accumulating portion for accumulating an operating time of an engine after a first starting; and
   wherein, if the accumulated operating time is shorter than or equal to a predetermined operating time, the control portion operates the idling stop and restarting system regardless of a real charging value of the battery.

18. The vehicle that is equipped with the idling stop and restarting system of claim 17, wherein the control portion forcibly sets the real charging value of the battery as a predetermined value when the accumulated operating time is shorter than or equal to the predetermined operating time.

19. The vehicle that is equipped with the idling stop and restarting system of claim 17, wherein the control portion operates the idling stop and restarting system based on the real charging value of the battery in case that the operating time.

* * * * *